Dec. 8, 1931. J. C. ALLEN 1,835,449
TRANSMISSION REPAIR COVER
Filed April 9, 1930
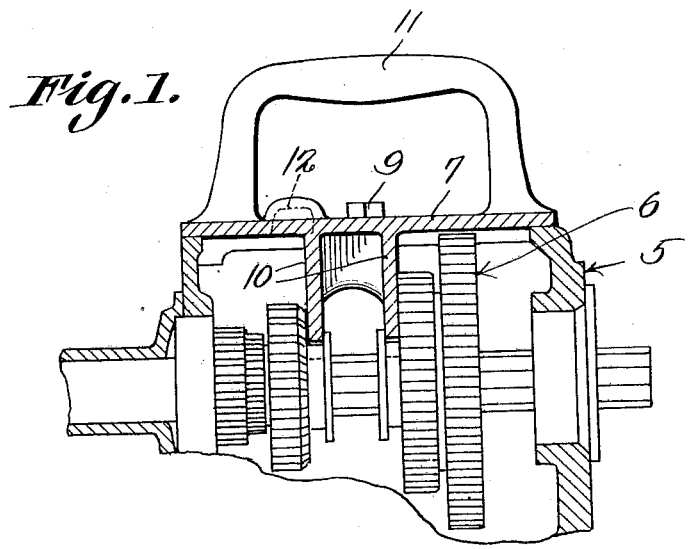
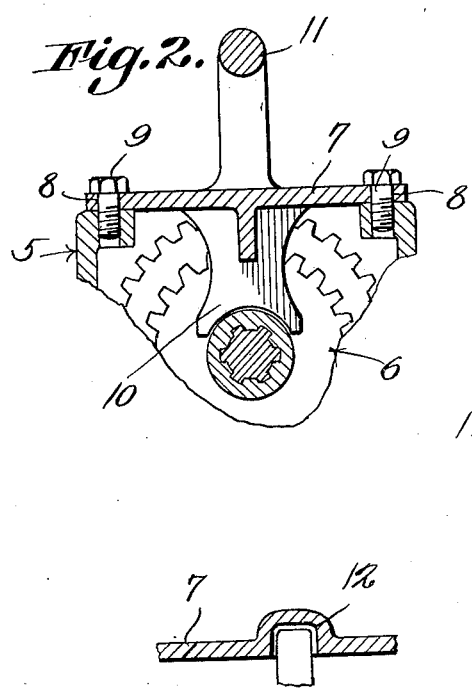
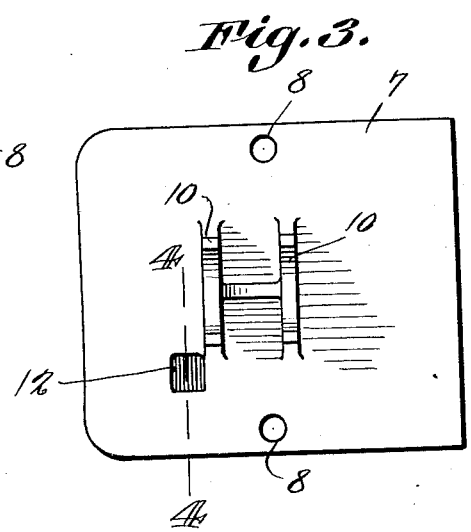
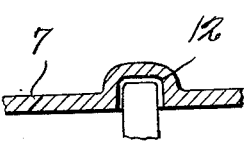
Joseph C. Allen
Inventor
By CASnow&Co.
Attorneys Patented Dec. 8, 1931

1,835,449

UNITED STATES PATENT OFFICE

JOSEPH C. ALLEN, OF MODESTO, CALIFORNIA

TRANSMISSION REPAIR COVER

Application filed April 9, 1930. Serial No. 442,987.

This invention relates to a repair cover for transmissions of a well known construction, the primary object of the invention being to provide a cover which may be positioned in lieu of the usual transmission cover, so that the gears of the transmission will be protected against foreign matter such as dirt, bolts or the like falling into the transmission while the transmission is being repaired.

Another object of the invention is to provide means to permit of the disassembling or assembling of a transmission or clutch housing with the brake lever and shift lever removed, thereby speeding up the repairing of the transmission or clutch.

Another object of the invention is to provide a cover plate of this character including a handle, whereby the transmission or clutch housing to which the device is connected, may be lifted, thereby eliminating the use of the usual unhandy chain or strap employed in lifting transmissions or clutch housings when being disassembled or assembled.

With the foregoing and other objects in view, which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a fragmental sectional view through a transmission housing, showing a cover plate constructed in accordance with the invention, as positioned thereon.

Figure 2 is a transverse sectional view through the plate.

Figure 3 is a bottom plan view of the plate.

Figure 4 is a sectional view taken on line 4—4 of Figure 3.

Referring to the drawings in detail, the reference character 5 designates a transmission housing in which the transmission indicated generally by the reference character 6, is housed.

The cover plate forming the essence of the invention is indicated by the reference character 7, and as shown is provided with openings 8 to receive the bolts 9 that pass into the transmission housing to secure the plate 7 in position.

Extending from the under side of the plate 7, are spaced fingers 10, which have their lower ends curved to fit within the shifter fork grooves of the sliding transmission gears so that the gears will be held in their neutral positions, it being understood that the distance between the outer edges of the fingers 10, is equal to the distance between adjacent sliding gears of the transmission.

A handle indicated by the reference character 11 is formed on the plate 7 and is so arranged that the transmission or clutch housing to which the plate is secured, may be lifted by the handle, eliminating the necessity of using the usual lifting chain or strap.

A depression indicated by the reference character 12, is formed in the under side of the plate 7 and accommodates the upper extremity of the reverse gear shifter fork of a transmission, when the device is positioned over a transmission opening wherein the transmission is of the four speed forward type, thereby holding the shifter fork against movement.

From the foregoing it will be obvious that due to this construction, it is possible to cover the usual transmission or clutch opening to prevent foreign matter from entering the transmission or clutch housing, and at the same time provide a handle, whereby the housing with which the device is connected, may be lifted to facilitate assembling or disassembling of the transmission or clutch.

I claim:

1. An auxiliary cover for transmissions, comprising a plate of a size to completely cover the transmission opening of a transmission housing, means for securing the cover to the transmission housing, and stationary spaced fingers extending downwardly from the plate and resting in the shifter fork grooves of the transmission gears, to hold the transmission gears against movement while the transmission is being removed.

2. An auxiliary cover for transmissions, comprising a plate to cover the transmission opening of a transmission, means for securing the plate to a transmission in lieu of the usual transmission plate, wide fingers depending from the under side of the plate, said fingers being spaced longitudinally of the plate to engage the shifter fork grooves of the sliding transmission gears to hold the gears spaced apart while the transmission is being removed.

In testimony that I claim the foregoing as my own, I have hereto affixed my signature.

JOSEPH C. ALLEN.